(12) United States Patent
Svendsen

(10) Patent No.: US 10,667,641 B2
(45) Date of Patent: Jun. 2, 2020

(54) APPARATUS FOR BREWING AND DISPENSING BEVERAGES

(71) Applicant: Østerlandsk Thehus, Copenhagen V (DK)

(72) Inventor: Torben Svendsen, Brønshøj (DK)

(73) Assignee: ØSTERLANDSK THEHUS, Copenhagen V (DK)

( * ) Notice: Subject to any disclaimer, the term of this patent is extended or adjusted under 35 U.S.C. 154(b) by 335 days.

(21) Appl. No.: 15/529,754

(22) PCT Filed: Nov. 30, 2015

(86) PCT No.: PCT/DK2015/050367
§ 371 (c)(1),
(2) Date: May 25, 2017

(87) PCT Pub. No.: WO2016/082841
PCT Pub. Date: Jun. 2, 2016

(65) Prior Publication Data
US 2017/0354291 A1 Dec. 14, 2017

(30) Foreign Application Priority Data
Nov. 28, 2014 (DK) .................................. 2014 00692

(51) Int. Cl.
*A47J 31/00* (2006.01)
*A47J 31/34* (2006.01)
(Continued)

(52) U.S. Cl.
CPC ........... *A47J 31/34* (2013.01); *A47J 31/0576* (2013.01); *A47J 31/469* (2018.08); *A47J 31/30* (2013.01)

(58) Field of Classification Search
CPC ...... A47J 31/057; A47J 31/0576; A47J 31/30; A47J 31/34
(Continued)

(56) References Cited

U.S. PATENT DOCUMENTS 5,025,714 A * 6/1991 Brewer ................. A47J 31/057
99/295
5,551,331 A 9/1996 Pfeifer et al.
(Continued)

FOREIGN PATENT DOCUMENTS

CN 102151093 A 8/2011
DE 2256527 * 1/1972 ............ A47J 31/057
(Continued)

OTHER PUBLICATIONS

Supplementary European Search Report for Serial No. 15 86 2999 dated Jul. 6, 2018.
(Continued)

*Primary Examiner* — Reginald Alexander
(74) *Attorney, Agent, or Firm* — McCormick, Paulding & Huber PLLC

(57) ABSTRACT

An apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle, wherein said hot water channel has at least one section forming a flow path for hot water, said at least one section of said hot water channel is configured such that it is in direct thermal contact with the periphery of said water tank along the entire length of said at least one section of said hot water
(Continued)

channel, and such that said at least one section of said hot water channel extends substantially parallel to the periphery of said water tank.

20 Claims, 3 Drawing Sheets

(51) Int. Cl.
  *A47J 31/057* (2006.01)
  *A47J 31/46* (2006.01)
  *A47J 31/30* (2006.01)
(58) Field of Classification Search
  USPC .............................................. 99/302 R, 307
  See application file for complete search history.

(56) References Cited

U.S. PATENT DOCUMENTS

| | | | |
|---|---|---|---|
| 5,647,269 A | | 7/1997 | Miller et al. |
| 6,142,063 A | * | 11/2000 | Beaulieu ................. A47J 31/32 99/283 |
| 2009/0007792 A1 | * | 1/2009 | Glucksman ......... A47J 31/4407 99/282 |
| 2010/0018407 A1 | | 1/2010 | Liu |

FOREIGN PATENT DOCUMENTS

| | | | | |
|---|---|---|---|---|
| DK | 90744 | C | 4/1961 | |
| EP | 1882433 | A1 | 1/2008 | |
| EP | 2147621 | A1 | 1/2010 | |
| GB | 616773 | * | 1/1949 | ............ A47J 31/057 |
| JP | 201348204 | A | 10/2013 | |
| WO | 01/76429 | A1 | 10/2001 | |
| WO | 2004/008019 | A2 | 1/2004 | |
| WO | 2005/041729 | A2 | 5/2005 | |
| WO | 2008/022669 | A1 | 2/2008 | |
| WO | 2014090880 | A1 | 6/2014 | |

OTHER PUBLICATIONS

International Search Report for PCT Serial No. PCT/DK2015/050367 dated Feb. 2, 2016.
Chinese Office Action with English Translation and Supplementary Search Report for Serial No. 201580065162.6 dated Feb. 3, 2020.

* cited by examiner

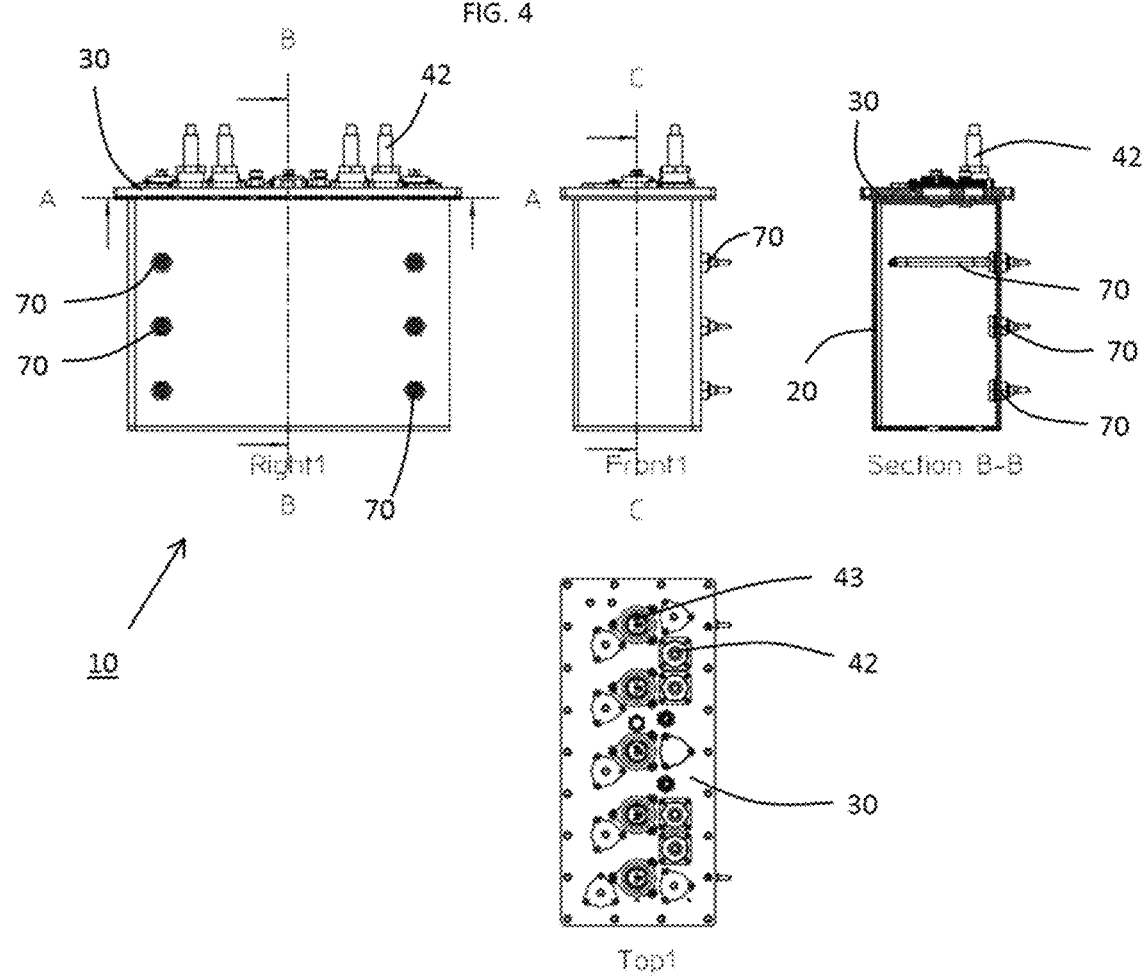

APPARATUS FOR BREWING AND DISPENSING BEVERAGES

CROSS-REFERENCE TO RELATED APPLICATIONS

This application is a National Stage application of International Patent Application No. PCT/DK2015/050367, filed on Nov. 30, 2015, which claims priority to Danish Patent Application No. PA201400692, filed on Nov. 28, 2014, each of which is hereby incorporated by reference in its entirety.

TECHNICAL FIELD

The present invention relates to an apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle.

An Apparatus for Brewing and Dispensing Beverages

The present invention relates to an apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle.

BACKGROUND OF THE INVENTION

Coffee machines are known in many variations, such as coffee machines for restaurant businesses, coffee machines for industrial firms as well as coffee machines for households.

It is well known that when brewing a cup of hot coffee freshly roasted beans are used, the grind and the right amount of water to the coffee ration are important factors to ensure a good cup of coffee. Likewise, to ensure a good cup of hot coffee the temperature of the water is very important. The water draws out the flavor from the coffee grounds, referred to as extraction.

Water temperature is essential in the extraction process, because if your water is too hot, you risk an over extraction, leaving the coffee with a bitter taste, and if your water is too cold, you can risk an under-extraction, where the coffee is weak, and maybe even tastes sour.

Typically the hot water located in the hot water tank has a higher temperature since the water cools down on the way between the hot water tank and the brewing chamber, such as pipelines and other components, such as valves and flow meter etc. Furthermore, this cooling down is not the same in each dispensing of coffee, as it depends on whether it is a first dispensing of coffee during which the pipe lines and components through which the hot water will run as well as the brewing chamber are in a cold state, or whether these areas are warmed up owing to the passage of the hot water from previously dispensed coffee. Depending upon the situation, the brewing water may have a temperature which is either too low or too high, which can affect the quality of the coffee dispensed.

Therefore it is desirable to provide an apparatus enabling a preferred water temperature during extraction.

SUMMARY

It is an object of the present invention to provide an apparatus for brewing and dispensing beverages, such as coffee, which minimizes the heat loss through the components of the apparatus.

This is achieved when said hot water channel has at least one section forming a flow path for hot water, said at least one section of said hot water channel is configured such that it is in direct thermal contact with the periphery of said water tank along the entire length of said at least one section of said hot water channel, and such that said at least one section of said hot water channel extends substantially parallel to the periphery of said water tank.

By minimizing the use of water pipes from the water tank to the coffee brewing chamber, less heat loss is obtained, and as a result a more stable temperature is achieved.

In an embodiment, the at least one section of said hot water channel constitute of a first hot water channel section arranged between said water tank outlet and a first control equipment, such as a valve.

In an embodiment, the at least one section of said hot water channel constitutes two hot water channel sections arranged between said water tank outlet and a first control equipment, such as a valve and a second control equipment, such as a flow meter.

In an embodiment, the apparatus comprising a manifold, said manifold comprising said at least one section of said hot water channel. By using a manifold fewer components are required, and furthermore, the previously used copper pipes and fittings are avoided.

In an embodiment, the manifold comprises a water outlet and said at least one section of said hot water channel connects said water tank outlet and said water outlet.

In an embodiment, an outer surface area of said manifold covering said at least one section of said hot water channel is positioned adjacently to a surface of said water tank.

In an embodiment, the outer surface area of said manifold constitutes an inner surface of said water tank.

In an embodiment, the water tank is covered by said manifold, whereby said manifold constitutes a water tank lid.

In an embodiment, the manifold comprises at least two layers, such as two plates bonded together.

In an embodiment, the said manifold comprises three layers, a first, a second and an intermediate layer positioned between said first and second layer.

In an embodiment, the at least one section of said hot water channel is formed in the intermediate layer by through going apertures or tracks.

In an embodiment, the at least one section of said hot water channel is formed by laser cutting.

In an embodiment, the apparatus comprising control equipment configured for controlling the brewing process, such as valves and flow meters and temperature sensors, said control equipment is arranged in connection with the manifold positioned along said hot water channel between the water tank outlet and said water outlet.

BRIEF DESCRIPTION OF THE DRAWINGS

An embodiment of the invention will be described in the following with the reference to the drawings wherein FIG. 4 is a side view, two end views and a top view of the apparatus shown in FIG. 3.

DETAILED DESCRIPTION

The present invention relates to an apparatus for brewing beverages such as coffee.

Figure 1:
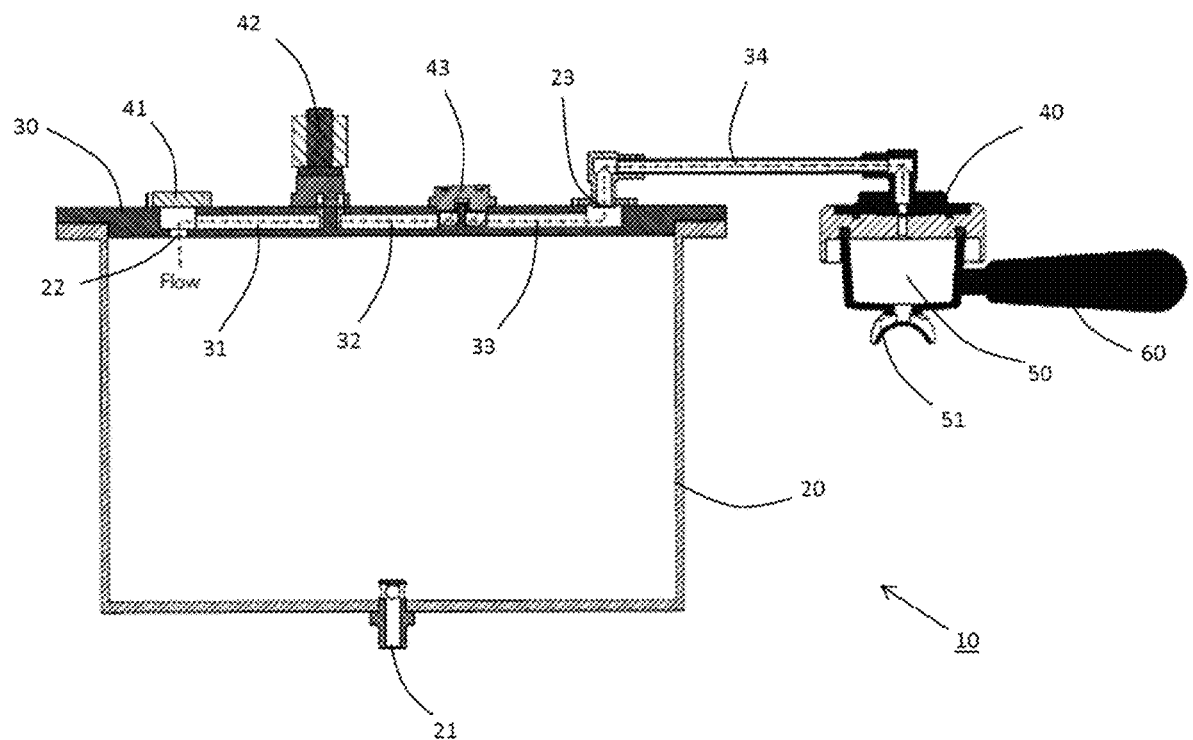
FIG. 1 is a side view of an apparatus according to the invention.

FIG. 1 illustrates an apparatus 10 comprising a water tank 20, a hot water channel 31,32,33,34, a water faucet 40 and a brewing chamber 50.

The apparatus 10 comprises a water tank 20 configured for storing of water. The water tank comprises a water tank inlet 21, which is configured for a fresh water supply line and a water tank outlet 22. The apparatus comprises a manifold 30 which comprises hot water channel sections 31,32,33 leading through the manifold along the extent of the manifold 30 parallel to the periphery of the water tank 20. The water tank outlet 22 constitutes a water inlet to the manifold 30.

The water tank comprises a bottom surface and a side surface and an upper surface. The manifold 30 constitutes a cover, such that the manifold covers the water tank, such that the bottom surface and a side surface of the water tank and the manifold enclosing the water chamber of the water tank 20.

During brewing, the water in the water tank 20 is lead through the water tank outlet 22 into the hot water channel sections 31,32,33 of the manifold passing by a filter 41, a celluloid valve 42 and a flow meter 43.

The filter 41, the celluloid valve 42 and the flow meter 43 is well-known equipment for controlling and monitoring the brewing process, the apparatus could as well be equipped with a temperature sensor and other technical means.

As the manifold 30 is in direct thermic contact with the water tank 20, the manifold 30 has the approximately same temperature as the water tank 20. Likewise, the hot water channel sections 31,32,33 have a similar thermic environment as the chamber of the water tank 20, and therefore the water do not change in temperature when flowing through the manifold and the control equipment connected to the manifold.

The water enters the water tank at the water inlet 21 and during the brewing process the water exits the water tank through the water tank outlet 22 and into the manifold 30.

The water tank outlet 22 is connected with the hot water channel section 31. The hot water channel section 31 and the hot water channel section 32 are connected with the celluloid valve 42. The hot water channel section 32 is connected with the hot water channel section 33 through the flow meter 43, and the hot water channel section 33 is connected with and is terminated by the manifold water outlet 23.

The figure illustrates that the water flows from the manifold water outlet 23 through the connecting pipe 34 to the water faucet 40 and the brewing chamber 50, and the brewed beverage leaves the apparatus through the nozzle 51. The brewing chamber 50 is connected to a handle 60.

Generally, the handle 60 may be twisted to lock and unlock the brewing chamber 50 top the water faucet 40.

The apparatus 10 illustrated in FIG. 1 comprises a water tank 20, a water inlet 21 configured for fresh water supply, and one or more heater elements 70. The apparatus 10 moreover comprises a water tank outlet 22, which is connected via a hot water channel 31,32,33,34 to a water faucet 40, a brewing chamber 50 and a dispensing nozzle 51, where the hot water channel 31,32,33,34 has at least one section forming a flow path for hot water, the at least one section of the hot water channel is configured such that it is in direct thermal contact with the periphery of the water tank 20 along the entire length of the at least one section of the hot water channel, and such that the at least one section of the hot water channel extends substantially parallel to the periphery of the water tank 20.

Figure 2:
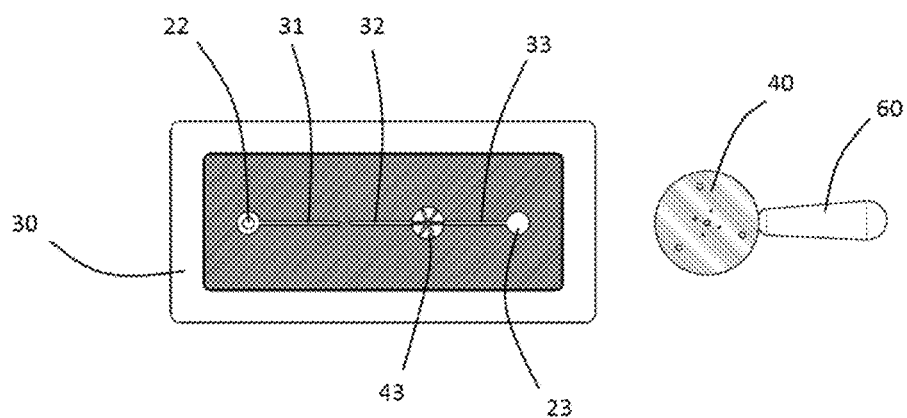
FIG. 2 is a cross sectional view of the embodiment shown in FIG. 1.

FIG. 2 illustrates a cross sectional view of the embodiment shown in FIG. 1.

The water tank outlet 22 is connected with the hot water channel section 31. The hot water channel section 31 and the hot water channel section 32 are connected with the celluloid valve 42, which is shown in FIG. 1.

The hot water channel section 32 is connected with the hot water channel section 33 through the flow meter 43. The hot water channel section 33 is connected with—and is terminated by—the manifold water outlet 23.

In the cross sectional view shown in FIG. 2, the water faucet 40 and the handle 60 also appear.

The hot water channel is illustrated in FIGS. 1 and 2 as a straight line comprising the hot water channel sections 31,32,33 through the manifold extending perpendicular to the outer surfaces of the manifold 30.

Figure 3:
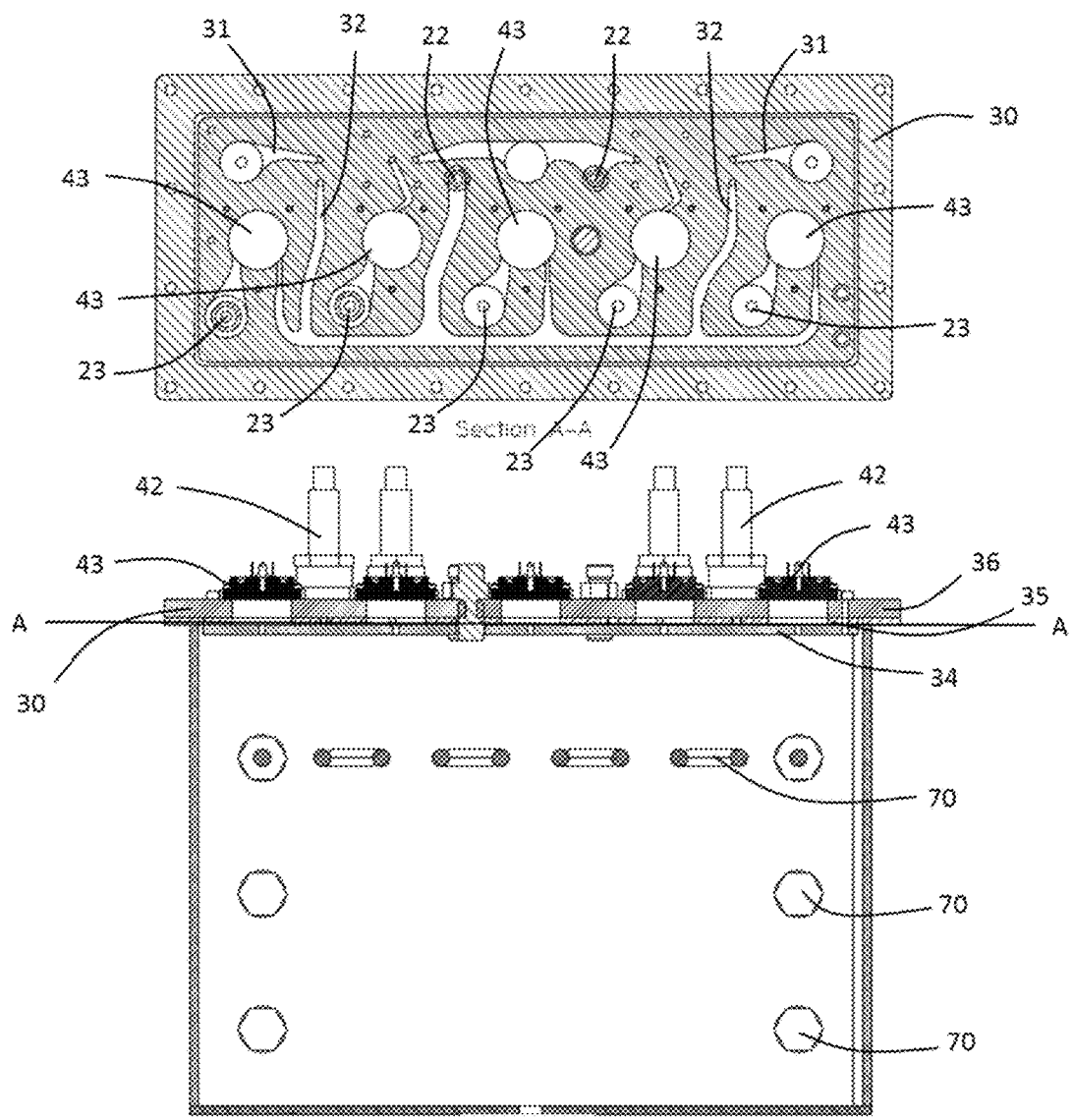
FIG. 3 is a cross sectional view and a side view of an apparatus according to the invention.

FIG. 3 illustrates a more complex embodiment of the apparatus, where the hot water channel sections are twisted, curved and tangled like a circuit board.

Generally, the hot water channel comprising hot water channel sections which are twisted and curved and tangled as illustrated in FIG. 3.

FIG. 3 shows a side view of the apparatus as well as a cross sectional view along the line A showing the intermediate layer 35 of the manifold 30, and the apparatus show in FIG. 3 comprises several filters 41, celluloid valves 42 and flow meters 43.

Generally, the manifold 30 comprises at least two layers, such as two plates bonded together.

Generally in some embodiments, the manifold 30 comprises at least three layers, a first, a second and an intermediate layer positioned between the first and second layer, as illustrated in FIG. 3. In the side view the three layers are shown, the inner layer 34, which constitutes an inner surface of the water tank 20, an intermediate layer 35 and an outer layer 36, respectively.

The hot water channel is formed in the intermediate layer by sections of through going apertures or tracks.

Generally, the apparatus 10 comprises more control equipments configured for controlling the brewing process, such as valves and flow meters and temperature sensors, the control equipment is arranged in connection with the manifold 30 positioned along the hot water channel between the water tank outlet 22 and the water outlet 23.

In FIG. 3 the inner layer 34 comprises several water tank outlets 22, likewise there are several celluloid valves 42, which connects hot water channel section 31 and hot water channel section 32.

The apparatus 10 comprises heater elements 70 positioned into three levels of the water tank 20.

FIG. 4 illustrates the apparatus 10 seen in a side view two end views and a top view of the apparatus 10 shown in FIG. 3.

FIG. 4 illustrates some of the components of the apparatus. Respectively the water tank 20, the manifold 30, flow meters 43, Celluloid valves 42 and heater elements 70.

The heater elements 70 are positioned into three levels extending inside the water tank 20 into the water chamber.

Preferably, the manifold 30 is made of laminated or molded plastic, and the hot water channel sections in the manifold 30 may be made by laser cutting or 3D printing.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle, wherein said hot water channel has at least one section forming a flow path for hot water, said at least one section of said hot water channel is configured such that it is in direct thermal contact with the periphery of said water tank along the entire length of said at least one section of said hot water channel, and such that said at least one section of said hot water channel extends substantially parallel to the periphery of said water tank,
wherein said apparatus comprising a manifold, said manifold comprising said at least one section of said hot water channel, and
wherein said manifold comprises at least two layers, such as two plates bonded together.

2. An apparatus according to claim 1, wherein said at least one section of said hot water channel constitutes a first hot water channel section arranged between said water tank outlet and a first control equipment.

3. An apparatus according to claim 1, wherein said manifold comprises a water outlet and said at least one section of said hot water channel connects said water tank outlet and said water outlet.

4. An apparatus according to claim 1, wherein an outer surface area of said manifold covering said at least one section of said hot water channel is positioned adjacent a surface of said water tank.

5. An apparatus according to claim 1, wherein said water tank is covered by said manifold, whereby said manifold constitutes a water tank lid.

6. An apparatus according to claim 1, wherein said manifold comprises three layers, a first, a second and an intermediate layer positioned between said first and second layer.

7. An apparatus according to claim 6, wherein said at least one section of said hot water channel is formed in the intermediate layer by through going apertures or tracks.

8. An apparatus according to claim 7, wherein said at least one section of said hot water channel is formed by laser cutting.

9. An apparatus according to claim 1, wherein said apparatus comprising control equipment configured for controlling the brewing process, said control equipment is arranged in connection with the manifold positioned along said hot water channel between the water tank outlet and said water outlet.

10. An apparatus according to claim 3, wherein said apparatus comprising control equipment configured for controlling the brewing process, said control equipment is arranged in connection with the manifold positioned along said hot water channel between the water tank outlet and said water outlet.

11. An apparatus according to claim 4, wherein said apparatus comprising control equipment configured for controlling the brewing process, said control equipment is arranged in connection with the manifold positioned along said hot water channel between the water tank outlet and said water outlet.

12. An apparatus according to claim 5, wherein said apparatus comprising control equipment configured for controlling the brewing process, said control equipment is arranged in connection with the manifold positioned along said hot water channel between the water tank outlet and said water outlet.

13. An apparatus according to claim 6, wherein said apparatus comprising control equipment configured for controlling the brewing process, said control equipment is arranged in connection with the manifold positioned along said hot water channel between the water tank outlet and said water outlet.

14. An apparatus according to claim 7, wherein said apparatus comprising control equipment configured for controlling the brewing process, said control equipment is arranged in connection with the manifold positioned along said hot water channel between the water tank outlet and said water outlet.

15. The apparatus according to claim 9, wherein the control equipment configured for controlling the brewing process comprises a valve, a flow meter, or a temperature sensor.

16. The apparatus according to claim 2, wherein the first control equipment comprises a valve.

17. An apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle, wherein said hot water channel has at least one section forming a flow path for hot water, said at least one section of said hot water channel is configured such that it is in direct thermal contact with the periphery of said water tank along the entire length of said at least one section of said hot water channel, and such that said at least one section of said hot water channel extends substantially parallel to the periphery of said water tank,
wherein said at least one section of said hot water channel constitutes two hot water channel sections arranged between said water tank outlet and a first control equipment and a second control equipment.

18. The apparatus according to claim 17, wherein the first control equipment comprises a valve and the second control equipment comprises a flow meter.

19. An apparatus for brewing and dispensing beverages such as coffee, said apparatus comprising a water tank comprising a water inlet configured for fresh water supply, and one or more heater elements, said apparatus comprising a water tank outlet, which is connected via a hot water channel to a water faucet a brewing chamber and a dispensing nozzle, wherein said hot water channel has at least one section forming a flow path for hot water, said at least one section of said hot water channel is configured such that it is in direct thermal contact with the periphery of said water tank along the entire length of said at least one section of said hot water channel, and such that said at least one section of said hot water channel extends substantially parallel to the periphery of said water tank,
wherein said apparatus comprises a manifold comprising said at least one section of said hot water channel, and wherein an outer surface area of said manifold constitutes an inner surface of said water tank.

20. An apparatus according to claim 19, wherein said apparatus comprising control equipment configured for controlling the brewing process, said control equipment is arranged in connection with the manifold positioned along said hot water channel between the water tank outlet and said water outlet.

\* \* \* \* \*